United States Patent Office 3,249,163
Patented May 3, 1966

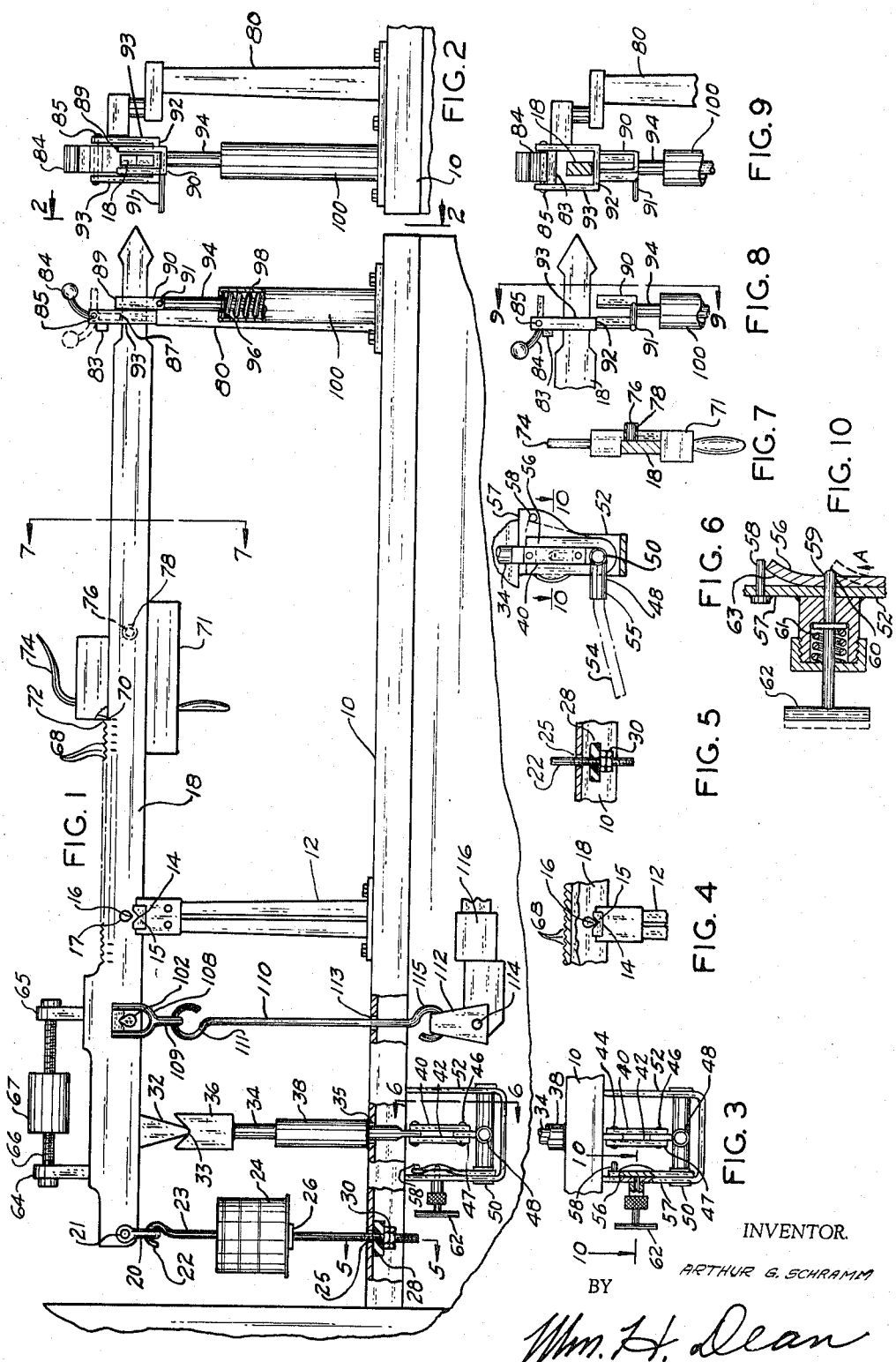

3,249,163
DEMOBILIZING MEANS FOR BALANCE BEAMS
OF PORTABLE WEIGHING SCALES
Arthur G. Schramm, 215 N. 28th St., Phoenix, Ariz.
Filed Dec. 24, 1963, Ser. No. 333,121
7 Claims. (Cl. 177—155)

This invention relates to a demobilizing means for balance beams of portable weighing scales and more particularly to a demobilizing means for such balance beams adapted to hold a conventional balance beam securely positioned so that the knife edge bearings thereof are disengaged and so that all of the functional equipment thereof is secured in position to prevent damage during transport on a vehicle.

Balance beams of weighing scales are generally supported on knife edge fulcrum bearing structures and the accuracy of a scale depends upon the careful maintenance of these knife edged structures at all times. When such structures are transported on a vehicle, bumpy surfaces of roadways tend to jar all of the equipment carried thereby and accordingly, it is not feasible to carry a scale balance beam with its knife edge fulcrum bearings in engagement. Such conditions would cause damage of the knife edge structures and create inaccuracy of the scale.

Accordingly, it is an object of the present invention to provide a very simple and efficient demobilizing means for the balance beams of portable weighing scales whereby such balance beams may be readily transported on vehicles over various uneven and rough roadways without damaging the knife edge fulcrum bearings of the balance beam or other important features of a scale.

Another object of the invention is to provide a novel demobilizing means for balance beams of portable weighing scales comprising a means for elevating and securely holding a balance beam in such position so as to disengage the knife edge fulcrum bearings of the beam to prevent them from being jarred and damaged during transit.

Another object of the invention is to provide a demobilizing means for balance beams of portable weighing scales comprising a restraining means at each end of a balance beam and means intermediate the ends of the scale to apply an upward force to hold the beam in opposition to the restraining means and to elevate the knife edge bearing structures of the beam out of engagement with bearing blocks normally engaged thereby during weighing operations.

Another object of the invention is to provide a demobilizing means for balance beams of portable weighing scales comprising a manually operable toggle means disposed to elevate a scale beam and to apply force upwardly intermediate the ends of the beam in cooperation with restraining means near opposite ends of the beam tending to resist said upward force at a location elevated such that the knife edge bearing structures of the beam are held above bearing blocks upon which the knife edge structures ordinarily rest when performing weighing operations.

Further objects and advantages of the invention may be apparent from the following specifications, appended claims and accompanying drawings, in which:

FIG. 1 is a side elevational view of a scale balance beam showing a demobilizing means for said balance beam in connection therewith and in accordance with the present invention;

FIG. 2 is an end view of the structure shown in FIG. 1 taken from the line 2—2 of FIG. 1;

FIG. 3 is a side elevational view showing fragmentarily a portion of the toggle lift mechanism disclosed in FIG. 1, but showing portions broken away and in section to amplify the illustration and showing a varying position of parts of the mechanism;

FIG. 4 is a side elevational view of the balance beam knife edge fulcrum bearings of the scale beam shown in FIG. 1 and showing these bearings in engaged position;

FIG. 5 is a fragmentary sectional view showing beam restraining means of the invention in a varying position from that as shown in FIG. 1;

FIG. 6 is a fragmentary sectional view taken from the line 6—6 of FIG. 1 and showing details of the toggle lift mechanism for the scale beam demobilizing means of the present invention;

FIG. 7 is a sectional view taken from the line 7—7 of FIG. 1;

FIG. 8 is a fragmentary side elevation view of another beam restraining means of the invention showing a varying position from that as shown in FIG. 1;

FIG. 9 is a sectional view taken from the line 9—9 of FIG. 8; and

FIG. 10 is an enlarged fragmentary sectional view taken from the line 10—10 of FIG. 3 and showing by broken lines a varying position of the latch mechanism disposed to hold the toggle lift mechanism in locked position when holding the scale beam elevated.

As shown in FIG. 1 of the drawings, a base frame 10 supports a bearing stand 12 having knife edge cradle bearings 14 supported thereon. These cradle bearings 14 are provided with substantially V-shaped notched portions 15 in which downwardly directed knife edge portions 16 of knife edged trunnions 17 are engageable. These conventional bearings are normally utilized on a scale balance beam 18 for the purpose of providing antifriction bearings to permit accurate tilting of the scale beam, as will be hereinafter described.

The beam 18 in spaced relationship with the knife edged trunnion bearings 17 is coupled to a clevis 20 by means of a clevis pin 21. This clevis is thus pivotally connected to the beam 18 by the pin 21 and the clevis 20 is engaged by a hook 22 of a suspension rod 23. This suspension rod 23 carries weights 24 on a collar 26 which is secured to the suspension rod. These weights 24 are normally utilized to calibrate the balance of the beam 18 over the fulcrum provided by the knife edge bearings 17.

The suspension rod 23 extends downwardly through an opening 25 in the frame 10 and surrounding the rod 23 below the opening 25 is a cushion 28 preferably made of rubber or other suitable material and this cushion 28 is supported on jam nuts 30 screw threadably fixed to the lower end of the rod 23. In the position shown in FIG. 1, the jam nuts 30 are firmly engaged with the lower portion of the cushion 28 and the upper portion of the cushion 28 is held securely against a lower surface of the frame 10 surrounding the opening 25, all as will be hereinafter described in detail.

The beam 18 at a location between the fulcrum bearings 17 and the clevis pin 21 is provided with a lift bearing 32. This beam lift bearing 32 is a downwardly converging structure having a pointed end engaged in an upwardly directed notch portion 33 of a beam lift bearing cradle 36 supported on a beam lift plunger 34 which is reciprocally mounted in a guide 38 secured to the frame 10. This guide 38 is a hollow cylindrical member in which the plunger 34 is reciprocally mounted.

The plunger 34 extends downwardly through an opening 35 in the frame below the guide 38 and a lower end of the plunger 34 is coupled to a pair of toggle bars 40 and 42 by means of a pin 44.

The lower end of the toggle bars 40 and 42 are coupled and pivotally connected by a pin 46 with an upwardly extending lever portion 47 of a toggle handle bearing 48. This handle bearing 48 is a hollow cylindrical bearing member through which a shaft 50 extends. Opposite ends of the shaft 50 are fixedly supported in a substantially U-shaped toggle mount bracket 52 which is secured to the lower side of the frame 10 either by welding or otherwise, as desired.

A handle 54 is inserted in a cylindrical socket 55 welded or otherwise secured to the toggle handle bearing 48.

The handle 54 is removably supported in the socket 55 and is adapted to be moved upwardly and downwardly to actuate the toggle bars 40 and 42 about the axes of the pins 44 and 46 for raising and lowering the plunger 34, as will be hereinafter described.

Fixed to the toggle handle bearing 48 is a locking lever 56 which is movably mounted in close proximity to a side 57 of the bracket 52. Projecting from the side 57 of the bracket 52 is a stop end 58 engagable by the lever 56 when the toggle members 40 and 42 are in a locked over center position.

The lever 56 is provided with an opening 59 through which a spring loaded plunger 60 is engaged to hold the lever 56 and the toggles 40 and 42 is locked position. This spring loaded plunger 60 is movable inwardly by a spring 61 and outwardly by manually operable plunger handle 62.

The lever 56 is provided with an inclined portion 63 which slides over the end of the plunger 60 when moving in a direction of an arrow A in FIG. 10 of the drawings when the toggles 40 and 42 are elevating the plunger 34, as will be hereinafter described, thereby automatically by-passing the plunger 60 until the opening 59 moves into position wherein the spring 61 may project the plunger 60 into the opening 59 and lock the lever 56 against the stop pin 58.

Brackets 64 and 65 on the beam 18 carry a weight supporting shaft 66 on which a conventional weight 67 is longitudinally movably mounted for conventional calibration purposes.

The beam 18 is provided with conventional slide engaging notches 68 of normal depth and at one end of the row of notches 68 and in accordance with the present invention, a deep notch 70 is provided which is a detent notch at an extreme position of the conventional slide 71. This detent notch is engagable by a notch engaging member 72 pivotally mounted or movably mounted on the slide 71 and this detent notch 70 engaged by the engaging member 72 is disposed to hold the slide 71 in position during transit and, thus, demobilize the slide. A stop pin 76 extending from one side of the beam 18 holds the slide 71 in opposition to the detent notch 70, thereby preventing the slide 71 from moving in either direction.

The conventional handle 74 is disposed operably to actuate the slide notch engaging member 72 in and out of either of the notches 68 or the detent notch 70, as desired.

As shown in FIG. 7 of the drawings, the stop pin 76 is surrounded by a resilient or soft sleeve 78 so that the slide 71 may be securely and resiliently held in position between the pin 76 and the deep notch 70.

Mounted on the frame 10 is an upstanding beam latch stand 80 of conventional construction. This stand 80, at its upper end is provided with a conventional pivoted latch 84 disposed to engage the upper surface of the beam 18 in the conventional manner. This latch 84 is pivoted on a conventional pivot pin 85 above the beam 18, and its pivoted movement is limited in a clockwise direction by a stop 83 on the stand 80.

Adjacent to the stand 80 is a substantially U-shaped beam holding yoke 90 having spaced fingers straddling said beam and adapted to prevent lateral movement thereof during transit or non use conditions. Said yoke is supported by a plunger 94 having a collar 96 urged upwardly by a coil spring 98 contained in a casing 100 supported securely on the frame 10. This cylinderical casing 100 holds the spring 98 and, thus, the beam 18 when in the position as shown in FIG. 1, is resiliently held upwardly against a lower edge 87 of the beam latch 84 by the yoke 90. Upper ends 89 of the yoke 90 when in the position shown in FIG. 1, prevent pivotal movement of the latch 84 in a counterclockwise direction.

The yoke 90 is provided with a projecting handle 91 disposed to assist an operator in pivoting the yoke 90 after it has been pressed dowwardly against compression of the spring 98 so that the yoke 90 may be disposed out of interference with the beam 18, and the latch 84 as shown in FIGS. 8 and 9 of the drawings. Said yoke 90 being, thus, engaged with an underside 92 of a yoke portion 93 of the beam latch stand 80.

A conventional pair of beam loading trunnions 102 are connected to the beam 18 in the conventional manner. These beam loading trunnions 102 are provided with upwardly directed knife edges engaged by complemental bearings of a conventional yoke 108 which is coupled to a conventional rod 110 which at its opposite end is coupled to a conventional clevis 112.

The yoke 108 is provided with a loop 109 engaged by an eye 111 of the rod 110. The rod 110 extends through an opening 113 in the frame 10 and is provided with an eye portion 115 engaging the clevis 112. This clevis 112 is provided with a pivot pin 114 which connects it with a lever 116 which transmits the load or weight of an article being weighed to the clevis 112, the rod 110 and to the balance beam 18 by means of the clevis 108 and knife edge trunnions 102.

The operation of the demobilizing means for balance beams of portable weighing scales in accordance with the present invention is as follows:

The beam 18 as shown in FIG. 1 of the drawings is held in elevated position by the beam lift bearing 32 engaged by the bearing cradle 36 forced upwardly and held in such a position by the plunger 34 when actuated by the toggles 40 and 42 and the manual lever 54. In this position, the knife edge portions of the knife edge trunnions 17 are disengaged from the knife edge cradle bearings 14 so that during transportation of the scale beam on a vehicle, the knife edged bearings are out of engagement and consequently cannot be chipped or damaged in any way.

With the upward force of the plunger 34 held by the toggles 40 and 42 the cushion 28 is held under compression so that the suspension rod 23 acts as a restraining means for the upward force of the toggles 40 and 42 while the opposite end of the beam is restrained by the latch 84 and is held upward by the cushioning effect of the spring 98, as hereinbefore described. Thus, opposite ends of the beam or portions of the beam at opposite sides of the knife edge bearing 17 are restrained in opposition to the force of the beam lift structure, including the toggles 40 and 42.

When the scale is in operation, the toggles 40 and 42 are pivoted downwardly so that the cradle 36 is disengaged from the beam lift bearing 32, thus, allowing the knife edges 17 to engage the cradle bearing 14 and to permit the beam 18 to pivot on these knife edge portions. At this time, the plunger 94 is depressed downwardly against compression of the spring 98 and is rotated by the handle 91 so that a portion of the yoke 90 engages a lower surface 92 of the beam latch stand 80. Thus, the outboard end of the beam 18 is free to swing in the conventional manner with relation to the stand 80 and the latch 84.

The spring 98 during transportation and in the position, as shown in FIG. 1, holds the beam securely up against the latch 84 at its lower surface 87, thus, preventing any movement of the beam 18 and accordingly, the general combination of the invention, includes restraining means for the beam at opposite sides of the knife edge bearings. Said restraining means being opposed by an upward lifting device applying an upward force to maintain the knife edge bearings disengaged and to prevent the beam 18 from any movement during transportation which might endanger the accurate features of these bearings.

The slide 71 is restrained longitudinally of the beam 18 by the detent notch 70 being engaged by the engaging member 72 and by the stop 76 surrounded by the resilient bushing 78, as hereinbefore described.

Operation of the latch pin 62 with relation to the lever 56 is as hereinbefore described and operates automatically to lock the toggles 40 and 42 in upwardly lifting position when the toggles go over center and raise the beam 18 to clear the knife edge bearings 17, as hereinbefore described.

It will be obvious to those skilled in the art that various modifications of the invention may be resorted to in a manner limited only by a just interpretation of the following claims.

I claim:

1. In a demobilizing means for balance beams of portable weighing scales the combination of: a frame; a balance beam; fulcrum bearing means therefor; balance weight means slidably mounted on said beam and adapted to be adjustably moved longitudinally therealong; a weight force applying means coupled to said beam; said fulcrum bearing means disposed between said balance weight means and said weight force applying means; a support for said fulcrum bearing means carried by said frame; and lift means on said frame for elevating and holding said beam upwardly to disengage said fulcrum bearing means from said support; said fulcrum bearing means being at an intermediate portion of said balance beam; and first restraining means connected to said frame and disposed to limit upward movement of said beam relative to said lift means and stationarily hold said beam against movement during transport and non use conditions.

2. In a demobilizing means for balance beams of portable weighing scales the combination of: a frame; a balance beam; fulcrum bearing means therefor; balance weight means slidably mounted on said beam and adapted to be adjustably moved longitudinally therealong; a weight force applying means coupled to said beam; said fulcrum bearing means disposed between said balance weight means and said weight force applying means; a support for said fulcrum bearing means carried by said frame; and lift means on said frame for elevating and holding said beam upwardly to disengage said fulcrum bearing means from said support; said fulcrum bearing means being at an intermediate portion of said balance beam; and first restraining means connected to said frame and disposed to limit upward movement of said beam relative to said lift means and stationarily hold said beam against movement during transport and non use condition; said restraining means having means resiliently opposing the lifting force of said lift means.

3. In a demobilizing means for balance beams of portable weighing scales the combination of: a frame; a balance beam; fulcrum bearing means therefor; balance weight means slidably mounted on said beam and adapted to be adjustably moved longitudinally therealong; a weight force aplying means coupled to said beam; said fulcrum bearing means disposed between said balance weight means and said weight force applying means; a support for said fulcrum bearing means carried by said frame; and lift means on said frame for elevating and holding said beam upwardly to disengage said fulcrum bearing means from said support; said fulcrum bearing means being at an intermediate portion of said balance beam; and first restraining means connected to said frame and disposed to limit upward movement of said beam relative to said lift means and stationarily hold said beam against movement during transport and non use conditions; said lift means being a manually operable toggle mechanism.

4. In a demobilizing means for balance beams of portable weighing scales the combination of: a frame; a balance beam; fulcrum bearing means therefor; a support for said fulcrum bearing means carried by said frame; and lift means on said frame for elevating and holding said beam upwardly to disengage said fulcrum bearing means from said support; said fulcrum bearing means being at an intermediate portion of said balance beam; and first restraining means connected to said frame and disposed to limit upward movement of said beam relative to said lift means and stationarily hold said beam against movement during transport and non use conditions; a latch stand on said frame provided with a latch member above said beam and disposed at a swinging end of said beam to control and limit upward movement of said swinging end; and second restraining means having a resilient element and disposed to bear upwardly on said beam resiliently to hold said beam upwardly against said latch member.

5. In a demobilizing means for balance beams of portable weighing scales the combination of: a frame; a balance beam; fulcrum bearing means therefor; a support for said fulcrum bearing means carried by said frame; and lift means on said frame for elevating and holding said beam upwardly to disengage said fulcrum bearing means from said support; said fulcrum bearing means being at an intermediate portion of said balance beam; and first restraining means connected to said frame and disposed to limit upward movement of said beam relative to said lift means and stationarily hold said beam against movement during transport and non use conditions; and second restraining means carried by said frame and disposed to hold a swinging end of said beam stationarily during transport and non use conditions.

6. In a demobilizing means for balance beams of portable weighing scales the combination of: a frame; a balance beam; fulcrum bearing means therefor; a support for said fulcrum bearing means carried by said frame; and lift means on said frame for elevating and holding said beam upwardly to disengage said fulcrum bearing means from said support; said fulcrum bearing means being at an intermediate portion of said balance beam; and first restraining means connected to said frame and disposed to limit upward movement of said beam relative to said lift means and stationarily hold said beam against movement during transport and non use conditions; a latch stand on said frame provided with a latch member above said beam and disposed at a swinging end of said beam to control and limit upward movement of said swinging end; and second restraining means having a resilient element and disposed to bear upwardly on said beam resiliently to hold said beam upwardly against said latch member; said second restraining means having an upwardly directed spring loaded telescopic and rotatable yoke disposed to straddle and engage said beam, said yoke being depressable and rotatable out of engagement with said beam; and means supported on said frame to hold said spring loaded yoke downwardly out of engagement with said beam.

7. In a demobilizing means for balance beams of portable weighing scales the combination of: a frame; a balance beam; fulcrum bearing means therefor; balance weight means slidably mounted on said beam and adapted to be adjustably moved longitudinally therealong; a weight force applying means coupled to said beam; said fulcrum bearing means disposed between said balance weight means and said weight force applying means; a support for said fulcrum bearing means carried by said frame; and lift means on said frame for elevating and holding said beam upwardly to disengage said fulcrum bearing means from said support; said fulcrum bearing means being at an intermediate portion of said balance beam; and first restraining means connected to said frame and disposed to oppose movement of said beam upwardly to thereby oppose force of said lift means and stationarily hold said beam against movement during transport and non use conditions.

References Cited by the Examiner

UNITED STATES PATENTS

| | | | |
|---|---|---|---|
| 1,869,357 | 8/1932 | Fuller | 177—247 |
| 1,900,418 | 3/1933 | Seederer | 177—150 |
| 1,988,655 | 1/1935 | Hamblin | 177—157 |
| 2,014,277 | 9/1935 | Bousfield | 177—157 |
| 2,567,161 | 9/1951 | Griffin | 177—155 X |
| 3,039,549 | 6/1962 | Meier | 177—151 |

FOREIGN PATENTS

| | | |
|---|---|---|
| 747,770 | 4/1933 | France. |
| 243,381 | 7/1946 | Switzerland. |

LOUIS J. CAPOZI, *Primary Examiner.*

STEPHEN J. TOMSKY, LEO SMILOW, *Examiners.*